United States Patent
Umealu

(10) Patent No.: US 11,383,977 B1
(45) Date of Patent: Jul. 12, 2022

(54) INCOMPLETE COMBUSTION AS A MEANS OF REDUCING CARBON DIOXIDE EMISSIONS

(71) Applicant: Samuel Okechukwu Umealu, Melbourne (AU)

(72) Inventor: Samuel Okechukwu Umealu, Melbourne (AU)

(*) Notice: Subject to any disclaimer, the term of this patent is extended or adjusted under 35 U.S.C. 154(b) by 102 days.

(21) Appl. No.: 17/020,957

(22) Filed: Sep. 15, 2020

Related U.S. Application Data

(60) Provisional application No. 62/974,679, filed on Dec. 17, 2019.

(51) Int. Cl.
- C01B 3/12 (2006.01)
- F02G 5/02 (2006.01)
- C25B 1/04 (2021.01)

(52) U.S. Cl.
CPC ............ C01B 3/12 (2013.01); F02G 5/02 (2013.01); *C01B 2203/062* (2013.01); *C01B 2203/84* (2013.01); *C25B 1/04* (2013.01)

(58) Field of Classification Search
CPC . C01B 3/12; C01B 2203/062; C01B 2203/84; C25B 1/04; F02G 5/02
See application file for complete search history.

(56) References Cited

U.S. PATENT DOCUMENTS

| 4,912,971 A * | 4/1990 | Jeambey | E21B 43/34 |
| | | | 324/333 |
| 2016/0017800 A1* | 1/2016 | Simpson | C25B 1/04 |
| | | | 422/162 |

\* cited by examiner

*Primary Examiner* — Jafar F Parsa

(57) ABSTRACT

What is disclosed herein is a process in which the first step is to use fossil fuel to generate clean energy by eliminating Carbon dioxide ($CO_2$) greenhouse gas emissions, harnessing renewable energy sources by using a product of the first step, providing storage for intermittent clean power, producing synthesis gas, a fuel gas mixture consisting primarily of carbon monoxide (CO) and hydrogen ($H_2$), which are used to produce fossil fuel or hydrocarbon that is then recycled to the first step to form a complete loop.

8 Claims, 1 Drawing Sheet

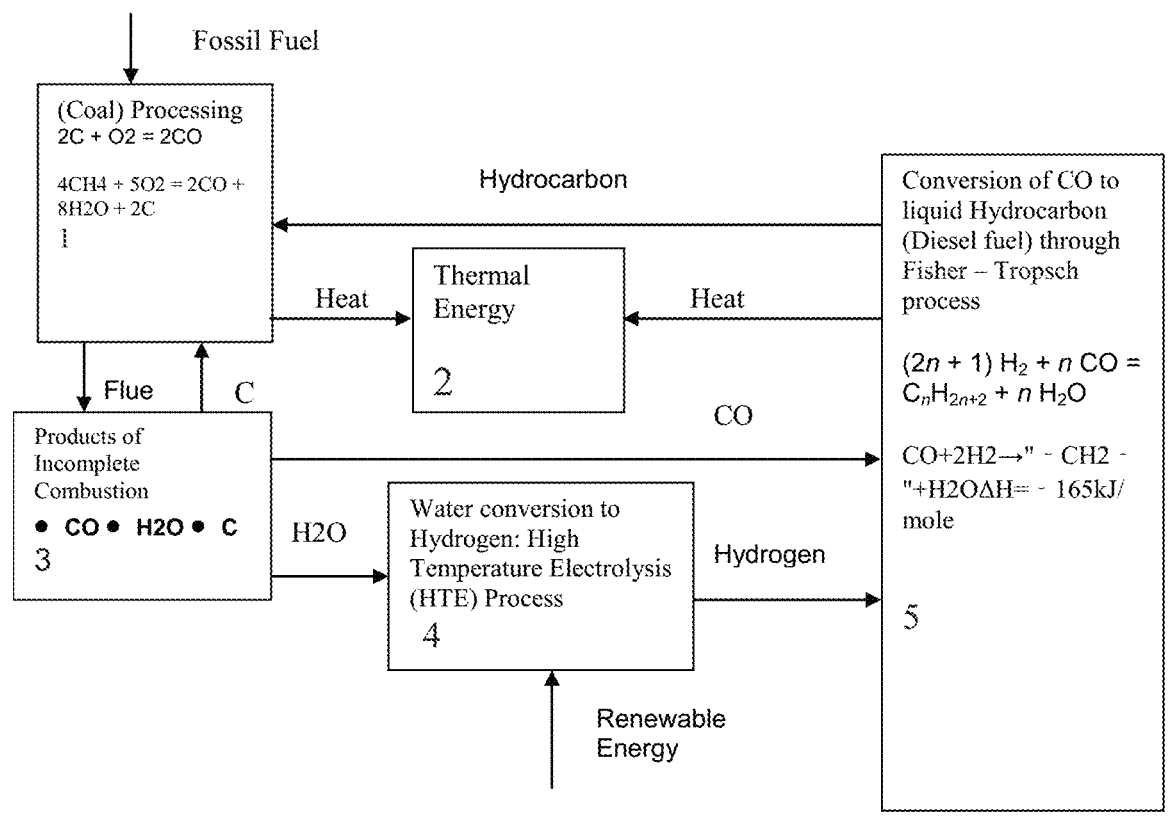

INCOMPLETE COMBUSTION AS A MEANS OF REDUCING CARBON DIOXIDE EMISSIONS

CROSS REFERENCES TO RELATED APPLICATIONS

This non-provisional patent application claims priority to provisional patent application 62/974,679 that was filed by the applicant, Dr. Samuel O. Umealu, on Dec. 17, 2019.

STATEMENT REGARDING FEDERALLY SPONSORED RESEARCH

Not Applicable

REFERENCE TO APPENDIX

Not Applicable

BACKGROUND OF THE INVENTION

Field of the Invention

The Carbon dioxide (CO2) has a significant impact on global warming [U.S. Environmental Protection Agency, Climate Change Indicators in the United States: Global Greenhouse Gas Emissions www.epa.gov/climate-indicators—Updated August 2016].

Emissions of Carbon dioxide (CO2) arise from a number of sources, mainly fossil fuel combustion to generate energy [U.S. Environmental Protection Agency, Climate Change Indicators in the United States: Global Greenhouse Gas Emissions www.epa.gov/climate-indicators—Updated August 2016]. Fossil fuel comprises Coal and hydrocarbons.

Emissions of Carbon dioxide (CO2) arise from complete combustion of fossil fuel, according to the following equation:

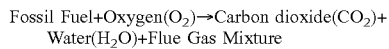
Fossil Fuel+Oxygen($O_2$)→Carbon dioxide($CO_2$)+Water($H_2O$)+Flue Gas Mixture The source of oxygen for this reaction is the atmospheric air.

Carbon monoxide (CO) is produced instead of Carbon dioxide ($CO_2$) in incomplete combustion of fossil fuel. Incomplete combustion happens when there is a limited supply of air [Wielgosinski, Grzegorz, (January 2012), Pollutant Formation in Combustion Processes] and may result in the following equation:

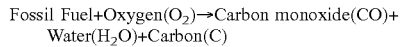
Fossil Fuel+Oxygen($O_2$)→Carbon monoxide(CO)+Water($H_2O$)+Carbon(C)

Water splitting is the chemical reaction in which water is broken down into oxygen and hydrogen, according to the following equation:

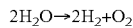
$2H_2O \rightarrow 2H_2 + O_2$

It is, in other words, electrolysis of water or the decomposition of water ($H_2O$) into oxygen ($O_2$) and hydrogen ($H_2$), due to an electric current being passed through it. Production of hydrogen from water is energy intensive. In low-temperature electrolysis, the energy consumed is more valuable than the hydrogen produced. Therefore, this process is not usually considered commercially viable. However, with high-temperature electrolysis (HTE) of water, more of the initial heat energy is converted into chemical energy (hydrogen), thereby making the processes an efficient and cost effective method of producing hydrogen ($H_2$), [Anne Hauch; Sune Dalgaard Ebbesen; Søren Højgaard Jensen and Mogens Mogensen, Journal of Materials Chemistry, Issue 20, 2008]. The commercial viability of high-temperature electrolysis (HTE) is improved by the use of an efficient catalyst in a process known as electrocatalysis.

Paul C. W. Chu et al have discovered that ferrous metaphosphate on self-supported conductive nickel foam which is commercially available in large scale, is a low cost material and an efficient catalyst that can be used for commercial hydrogen production by electrocatalytic water splitting [Haiqing Zhou, Fang Yu, Jingying Sun, Ran He, Shuo Chen, Ching-Wu Chu, and Zhifeng Ren, PNAS first published May 15, 2017]. The commercial viability of the electrocatalytic process is further improved by the use of renewable energy sources. Anne Hauch et al have theorised that high-temperature electrolysis (HTE) of water by using electricity produced from sustainable, non-fossil energy sources may provide an efficient, cost effective and environmentally friendly production of hydrogen ($H_2$) [Anne Hauch; Sune Dalgaard Ebbesen; Søren Højgaard Jensen and Mogens Mogensen, Journal of Materials Chemistry, Issue 20, 2008].

The use of renewable energy sources in the electrocatalysis of water provides means of exploiting renewable energy sources and also for storing intermittent "clean" energy. Unlike solar power, wind power, and other intermittent "clean" energy sources, hydrogen can be easily stored. Therefore, this process also provides means of storing intermittent renewable power by conversion to chemical energy in hydrogen.

The Fischer-Tropsch is a reaction involving carbon monoxide (CO) and hydrogen ($H_2$) to produce fossil fuel in the form of hydrocarbons [A. P. Steynberg; H. G. Nel, Fuel 83 (2004) 765-770].

Combustion of hydrogen ($H_2$) results in the emission of Nitrous oxide [Colorado, Andres & Mcdonell, Vincent & Samuelsen, Scott. (2016). Direct emissions of nitrous oxide from combustion of gaseous fuels. International Journal of Hydrogen Energy.-.10.1016/j.ijhydene.2016.09.202.]. Nitrous oxide is a greenhouse gas which contributes to the global warming.

SUMMARY OF INVENTION

This invention provides a viable solution to the problem of global warming to the extent of which it is caused by Carbon dioxide (CO2) emissions arising from the use of fossil fuels to generate energy. It is a process that transforms fuels such as coal and other hydrocarbons from "dirty" to "clean" source of energy. Future power plants may use fossil fuels or the so called dirty fuels to generate Clean energy by using this invention. Existing power plants that currently use fossil fuels as feedstock can be amended to commence generation of Clean energy by using this invention.

This invention provides the means of harnessing renewable energy sources. It is also a viable solution to the problem of intermittent renewable power storage.

This invention provides a "clean" source of cheap commercial scale synthesis gas, a fuel gas mixture consisting primarily of carbon monoxide (CO) and hydrogen ($H_2$). The fuel gas mixture is used to produce hydrocarbons in a Fischer-Tropsch process.

These together with additional objects, features and advantages of the incomplete combustion as a means of reducing Carbon Dioxide emissions will be readily apparent to those of ordinary skill in the art upon reading the following detailed description of the presently preferred, but nonetheless illustrative, embodiments when taken in conjunction with the accompanying drawings.

In this respect, before explaining the current embodiments of the incomplete combustion as a means of reducing Carbon Dioxide emissions in detail, it is to be understood that the incomplete combustion as a means of reducing Carbon Dioxide emissions is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the incomplete combustion as a means of reducing Carbon Dioxide emissions.

It is therefore important that the claims be regarded as including such equivalent construction insofar as they do not depart from the spirit and scope of the incomplete combustion as a means of reducing Carbon Dioxide emissions. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 1 is a block diagram of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIG. 1.

This invention provides a viable solution to the problem of global warming as caused by Carbon dioxide ($CO_2$) emissions arising from fossil fuel combustion to generate energy. The process is illustrated by the diagram (FIG. 1). In step 1 of the process, this invention uses incomplete combustion to ensure an output of carbon monoxide (CO) and water ($H_2O$), instead of Carbon dioxide ($CO_2$) and Water ($H_2O$), as would have been the case if complete combustion were used.

In step 3 of the process, carbon monoxide (CO), water ($H_2O$) and carbon (C) are separated. Carbon monoxide (CO), a valuable component of synthesis is sent to step 5 where it takes part in Fischer-Tropsch reaction, in which fossil fuel in the form of hydrocarbon is produced. Carbon (C) is recycled to step 1, while water ($H_2O$) is sent to step 4, where it is used as feedstock for high-temperature electrolysis (HTE).

In step 4 of the process, water ($H_2O$) from step 3 is made to undergo high-temperature electrocatalysis, by using renewable power. This process provides an efficient, cost effective, environmentally friendly and high scale production of commercial hydrogen ($H_2$). The use of renewable power in this step to generate hydrogen ($H_2$) translates to conversion of these renewable energy supply to chemical energy. Hydrogen ($H_2$) is a valuable component of synthesis gas and will be used in step 5, along with Carbon monoxide (CO) to create fossil fuel, in the form of hydrocarbons. conversion of renewable energy to chemical energy provides a viable solution to the problem of intermittent renewable power storage.

Renewable energy sources include Biofuel, Biomass, Geothermal, Hydroelectricity, Solar, Wind, Tidal and Wave. Some of these energy sources are known to produce intermittent power.

This invention results in the production of synthesis gas, a fuel gas mixture consisting primarily of carbon monoxide (CO) and hydrogen ($H_2$), in steps 1 and 4, respectively. These two gases (carbon monoxide (CO) and hydrogen ($H_2$)) are made to undergo the Fischer-Tropsch reaction in step 5, to produce fossil fuel in the form of hydrocarbons. The resulting fossil fuel is recycled to step 1. Direct combustion of the Hydrogen produced in step 4 to generate energy is not advisable. Combustion of hydrogen ($H_2$) results in the emission of Nitrous oxide. Nitrous oxide is a greenhouse gas and contributes to global warming.

According to Wikipedia, the Fischer-Tropsch process is a collection of chemical reactions that converts a mixture of carbon monoxide and hydrogen into liquid hydrocarbons. These reactions occur in the presence of metal catalysts, typically at temperatures of 150-300° C. (302-572° F.) and pressures of one to several tens of atmospheres. The process was first developed by Franz Fischer and Hans Tropsch at the Kaiser-Wilhelm-Institut für Kohlenforschung in Germany, in 1925.

With respect to the above description, it is to be realized that the optimum dimensional relationship for the various components of the invention described above and in FIG. 1 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A process for using incomplete combustion to eliminate or reduce carbon dioxide emissions which occur when fossil fuel is used to generate energy by combustion;

wherein renewable energy sources comprise Biofuel, Biomass, Geothermal, Hydroelectricity, Solar, Wind, Tidal and Wave are used in the high-temperature electrolysis of the water output of the fossil fuel combustion to produce hydrogen;

wherein the use of renewable energy sources comprise Biofuel, Biomass, Geothermal, Hydroelectricity, Solar, Wind, Tidal and Wave in the high-temperature electrolysis of the steam output of the fossil fuel combustion to produce hydrogen ($H_2$), is considered means of harnessing renewable energy sources;

wherein the use of intermittent renewable energy sources comprise Geothermal, Hydroelectricity, Solar, Wind, Tidal and Wave in the high-temperature electrolysis of the water output of the fossil fuel combustion to produce hydrogen is considered means of storing power from these and other intermittent renewable energy sources;

wherein the use of renewable energy sources comprise Biofuel, Biomass, Geothermal, Hydroelectricity, Solar, Wind, Tidal and Wave in the high-temperature electrolysis of the water output of the fossil fuel combustion to produce hydrogen is considered means of converting these and other renewable energy sources to chemical energy.

2. The method of claim 1, wherein Carbon Monoxide is recovered from the flue gas mixture output of the fossil fuel combustion.

3. The method of claim 1, wherein Carbon is recovered from the output of the combustion of the fossil fuel and re-cycled to the first step of incomplete combustion and the waste steam split to produce Hydrogen.

4. The method of claim 1, wherein high-temperature electrolysis of the water output of the fossil fuel combustion is used to produce hydrogen.

5. The method of claim 4, wherein carbon monoxide and hydrogen, are used to produce fossil fuel or hydrocarbons, through a Fischer-Tropsch reaction.

6. The method of claim 1, wherein the fossil fuel of claim 5 is recycled to the first step of incomplete combustion of fossil fuel.

7. The method of claim 1, wherein the energy output of a Fischer-Tropsch reaction is recovered.

8. The method of claim 1, wherein hydrogen ($H_2$), resulting from claim 4, is used to produce energy.

* * * * *